Figure 1:
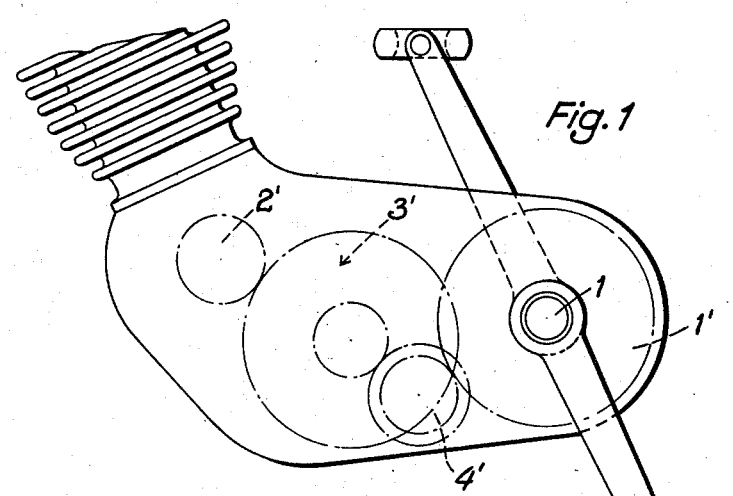

March 12, 1957  A. RODER  2,784,709
GEARING FOR A TWO-WHEELED VEHICLE
Filed March 31, 1953

Inventor:
A. Roder
ATTYS.

2,784,709

GEARING FOR A TWO-WHEELED VEHICLE

Albert Roder, Neckarsulm, Wurttemberg, Germany, assignor to NSU Werke Aktiengesellschaft, Neckarsulm, Wurttemberg, Germany Application March 31, 1953, Serial No. 345,758

Claims priority, application Germany April 9, 1952

4 Claims. (Cl. 123—185)

The invention relates to a gearing arrangement for a two-wheeled vehicle, the engine of which is started by a crank-pedal arrangement, and the gearing has at least two gear ratios.

Such gearing arrangements are particularly intended for fitting on vehicles of the bicycle type and are intended to drive such a bicycle under the action of a very small engine.

Since the satisfactory use of the small engine is dependent on the use of transmissions of the smallest possible weight and since also there is the natural desire to arrange the drive of the vehicle so that it is similar to that of a motor cycle, there are factors of design which contradict one another, with the result that gears which can be used in practice for such purposes have not been developed until the present invention.

Because of its simple and space-saving construction, the gearing arrangement according to the present invention solves the aforementioned problem in a manner which is entirely adequate for practical use.

This is achieved in accordance with the invention by the fact that the part of the gear which transmits the starting torque from the pedal cranks with a stepped-up ratio also serves as a counter shaft for the low gear ratio or lower gear ratios.

In the event that the gear is an ordinary toothed wheel gear, then in accordance with the invention, those pairs of toothed wheels or transmissions which transmit the comparatively slow starting movement of the cranks to the crank shaft of the motor at high speed, are used in such manner that, after starting the engine and upon engaging the low gear ratio or lower gear ratio, they serve as a counter shaft between the crank shaft, on the one hand, and the driving gear wheel, on the other hand.

The particular advantage of this arrangement in accordance with the invention is to be found in that it requires considerably fewer components than hitherto was thought possible and thus weight and space is saved.

Nevertheless, the operating ability of the gearing arrangement, that is to say, the starting of the engine from "stop" by pressing down on the crank and the starting off from a stationary position with the engine running, and also the use of the change gear means, is in no way impaired.

Also coming within the scope of the invention is a gearing arrangement for which the characterising feature is that while running in direct drive, the gear wheels which are positively engaged in the low gear ratios and are used in starting run idly and therefore do not require any power, apart from the small frictional losses.

This also represents an advantageous change from the known proposals, since in these the different wheels of the gearing are positively driven in all phases of the gear changing.

Figure 2:
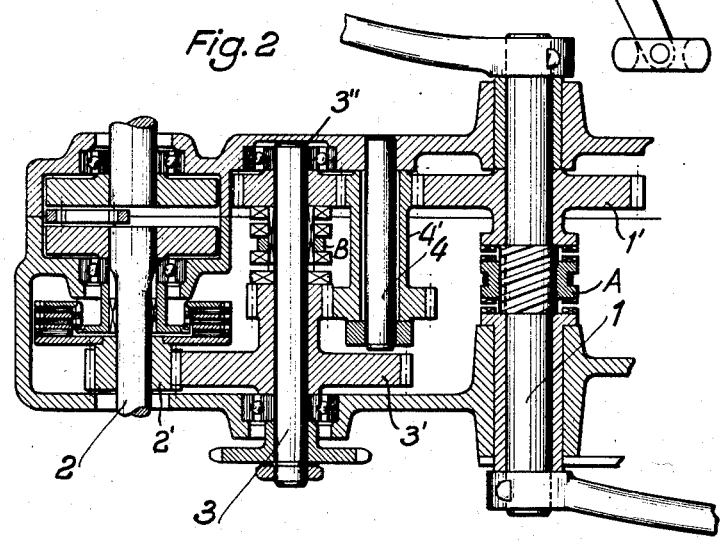
Figure 3:
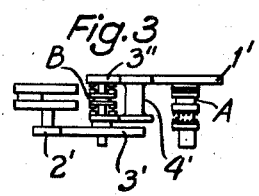
Figure 4:
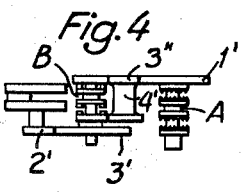
Figure 5:
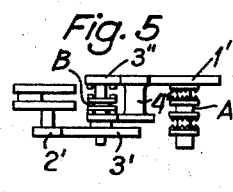

Further details of the invention will be apparent from the following description of the constructional example shown in the accompanying drawings, wherein:

Figure 1 is a side elevation of the gearing arrangement with the associated engine, Figure 2 is a section through the gearing arrangement in the no-load position, Figures 3, 4 and 5 show diagrammatically the gearing arrangement corresponding to the starting position, the engagement of the first gear ratio and the engagement of the second gear ratio.

The operation of the gearing arrangement according to the invention can be appreciated without difficulty from the figures.

1 is the shaft of the crank arrangement which is used for starting, 2 is the engine shaft, 3 a gear shaft and 4 a separate counter shaft.

In starting up the dog clutch A is engaged to lock shaft 1 to gear 1'. Gear 1' in turn meshes with counter shaft gear 4' which meshes with "high" gear 3' which meshes with driving gear 2' mounted on the end of engine crank shaft 2. This procedure cranks the engine at high speed without propelling the bicycle. In order to use the engine to propel the bicycle, dog clutch B must be engaged with either gear 3' which will give the "high" speed ratio or with gear 3" which, through counter shaft 4', will give the "low" speed ratio.

The operation of the separate gear ratios in the diagrammatically represented gearing arrangement are clearly shown in Figures 3 to 5, so that further explanations in this respect are not necessary.

I claim:

1. A gear train for a motor propelled vehicle comprising a spur gear mounted on a shaft driven directly by a motor, a drive shaft mounted parallel to said motor shaft, a cluster gear driven by said spur gear mounted on said drive shaft for free rotation thereon, a second gear mounted on said drive shaft for free rotation spaced from said cluster gear, countershaft gear means drivingly engaging said cluster gear and said second gear, a clutch for engagement with said cluster gear or said second gear mounted on the drive shaft between said gears, and a crank operated gear drivingly engaged with the countershaft gear means.

2. A gear train for a motor vehicle in which the motor is started by a crank device comprising, a drive shaft supported between two bearings, a cluster gear comprising two gear surfaces mounted for free rotation on said drive shaft adjacent one of said bearings, a single gear mounted for free rotation on said drive shaft adjacent the other of said bearings, clutch surfaces on said cluster gear and on said single gear on their adjacent surfaces, a clutch means splined to said drive shaft between said cluster gear and said single gear for coaction therewith to provide a neutral position, a low, and a high-gear position, a motor mounted gear in driving engagement with one of the gear surfaces of said cluster gear, a countershaft cluster gear drivingly engaging said single gear, and the other gear surface of said cluster gear, and a crank operated gear engaged with one of said countershaft gears.

3. A drive gear train for engine driven vehicles comprising a drive shaft supported by two gearings, a first gear rotatably mounted on said shaft between said bearings and adjacent one of said bearings, a second gear rotatably mounted on said shaft between said bearings and adjacent the other said bearing, clutch teeth mounted on each of said gears, a dog clutch splined to said drive shaft for engagement with the clutch teeth on one or other of said gears, a countershaft mounted parallel to said drive shaft carrying gears meshing respectively with said first and second gears, a pedal crank shaft mounted parallel to and adjacent said countershaft, an engine starting gear rotatably mounted on said pedal crank shaft and meshing with one of said countershaft gears, clutch means mounted on said pedal crank shaft to engage said engine starting gear, and gear means mounted on said first gear meshing with a gear mounted on an engine by which the engine is driven for starting the engine and by which the vehicle is driven in operation.

4. A motor bicycle multi-speed transmission comprising a gear mounted on the engine shaft, a drive shaft adjacent and parallel to said engine shaft, a two gear cluster mounted for free rotation on said drive shaft, the first gear of which is driven by said gear mounted on the engine shaft, a countershaft means driven by the second gear of said cluster, a single drive gear mounted for free rotation on said drive shaft and driven by said countershaft means, a clutch means mounted to clutch either said second gear of said cluster or said single drive gear to said drive shaft, and a crank operated starting gear meshing with one of the gears of said countershaft.

References Cited in the file of this patent

UNITED STATES PATENTS

| 2,644,439 | Behringer | July 7, 1953 |

FOREIGN PATENTS

| 680,066 | Great Britain | Oct. 1, 1952 |
| 481,250 | Italy | May 26, 1953 |